United States Patent [19]

Kilby et al.

[11] 3,920,979

[45] Nov. 18, 1975

[54] ELECTRONIC CHECK WRITER

[75] Inventors: Jack S. Kilby; Robert F. Schweitzer; John McCrady, all of Dallas, Tex.

[73] Assignee: Jack S. Kilby, Dallas, Tex.

[22] Filed: Oct. 19, 1973

[21] Appl. No.: 407,804

[52] U.S. Cl. .............................. 235/168; 340/172.5
[51] Int. Cl.² .................... G06F 15/02; G06F 15/30
[58] Field of Search ........................ 235/168, 156, 3; 340/172.5

[56] References Cited

UNITED STATES PATENTS

| | | | |
|---|---|---|---|
| 3,453,601 | 7/1969 | Bogert et al. | 340/172.5 |
| 3,739,161 | 6/1973 | Gross et al. | 235/156 |
| 3,748,452 | 7/1973 | Ruben | 235/168 |

*Primary Examiner*—David H. Malzahn
*Attorney, Agent, or Firm*—Richards, Harris & Medlock

[57] ABSTRACT

A personal check accounting unit includes an alphanumeric keyboard for entry of transaction data including an alphabetic portion and a numeric portion. The transaction data is stored and a calculator unit responds to the numeric portions to operate thereon to compute balance data. A memory receives and stores the output from the calculator, and print means is actuated in response to entry of the alphanumeric data for printing a verification thereof along with the contents of the memory. In one aspect, a check pack holder is attached to the printer, and an electrical storage unit in the pack powers the print means to print the quantity of checks in the pack.

14 Claims, 17 Drawing Figures

ELECTRONIC CHECK WRITER

This invention relates to a personalized portable unit for maintaining an accurate record corresponding to a conventional check stub, and more particularly to provide an accurate recording of transfers of funds to or from a checking account. In a further aspect, the invention relates to a portable personal device for writing checks while maintaining a record of the account.

Banking systems employ processing machines of various levels of sophistication, size, cost, and capability to handle and maintain accurate records of depositer's accounts. The conventional personal check book has heretofore been the vehicle used by the depositer to withdraw funds from a checking account, the checks being hand written or typed from a bulk supply. The depositer's personal balance normally is kept on a check stub forming part of the checkbook.

The present invention is directed to a personalized electronic check writer (ECW) in the form of a portable device of pocket size capable of writing checks while maintaining a record corresponding to a conventional check stub, arithmetically performing operations necessary to determine the checking account balance.

In accordance with one aspect of this invention, a personal check accounting unit includes an alphanumeric keyboard for entry of transaction data including an alphabetic portion and a numeric portion. The transaction data is stored and a calculator unit responds to the numeric portions to operate thereon to determine a new balance. A store memory receives and stores the output from the calculator and a print means is actuated in response to entry of the alphanumeric data for printing a verification thereof along with the contents of the store memory.

In accordance with another aspect of this invention, a portable electro-mechanical check writing unit is provided in integrated semiconductor circuit form with an alphanumeric keyset for entering alphanumeric data for use in connection with issue of check. A function key serves manually to command a checking operation. operation. A first storage means stores the input data. A calculator unit operates in response to storage of a numerical part of the data to compute a new balance and a second storage means stores the new balance. A printing unit includes means for automatically printing a copy of the contents of the first and second storage means.

For a more complete understanding of the present invention and for further objects and advantages thereof, reference may now be had to the following description taken in conjunction with the accompanying drawings in which.

Figure 13:
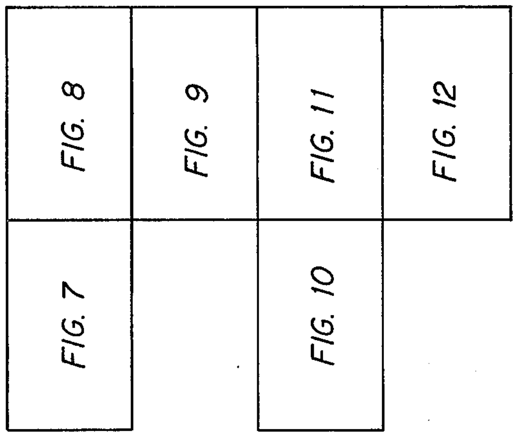
Figure 6:
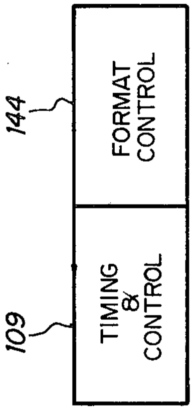
FIG. 6 is a block diagram of the electrical portions of the systems.
Figure 6:
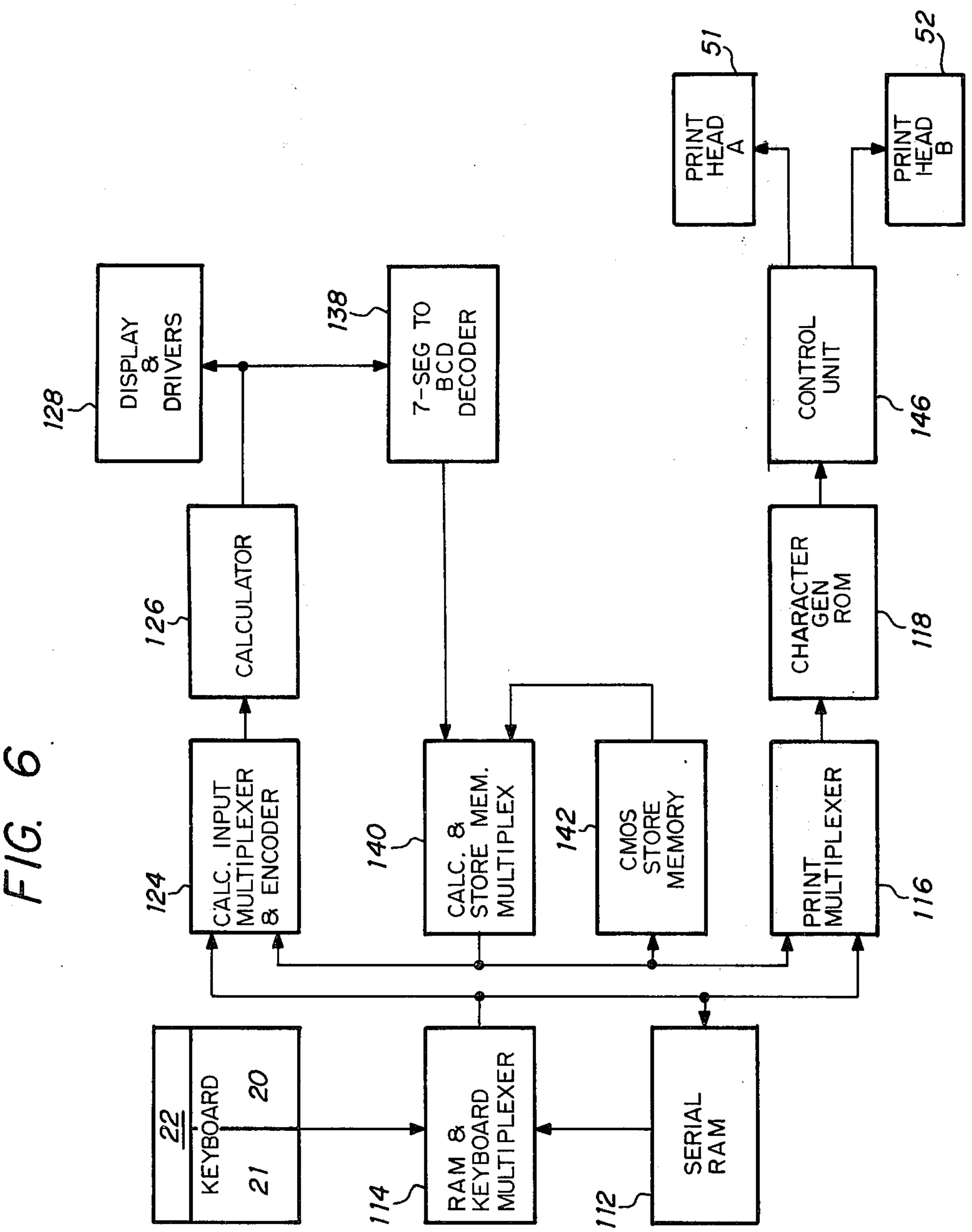

FIGS. 7–12 comprise a detailed circuit diagram of an embodiment of the electrical portion of the system of FIG. 6; and FIG. 13 illustrates the relationship between the sheets of drawings of FIGS. 7–12.

The present invention will be described in connection with a particular embodiment which is small in size as to be portable, fitting into a pocket of usual apparel and having some likeness as to size to small present day portable electronic calcuators. A system is provided with a keyboard input of a conventional four function calculator together with an alphabetic and function input keysets.

The unit accommodates the following operations. A person wishing to write an ordinary personal check would enter through the keyboard the check number, date, the name of the payee, and the amount of the check which is to be written. Also entered may be a code specifying the nature of the transaction involving the check as might assist in bookkeeping for tax purposes.

Once the foregoing entry is made, a numeric portion of the entry, namely the amount of the check, is then utilized by the calculator to calculate a new balance from a previously stored balance. A first printer is automatically actuated to print the check number, date, name of the payee, the amount of the check and the new balance on a stub sheet. If, upon verifying that the transaction represented by the printout on the stub sheet is accurate and is to be actually printed on the check, then a print check function button is actuated whereby a second printer automatically will print the check number, date, name of the payee and the amount of the check together with the code but omitting the new balance. Thereafter, the check may be manually ejected from the print unit and upon execution by the maker made in negotiable form.

The embodiment to be described contemplates the use of a check pack in which a replenishable supply of check blanks can be attached to the electronic printer unit. With the foregoing generalized description of the system and its intended operation, the following detailed description will now be given in order to portray completely the specific embodiment of the invention. It is to be understood that modifications may be made in order to apply the invention to differing objectives. For example, in a checkless society, the unit may be employed to store and maintain a current balance in an account so that when a checking transaction is contemplated, the party can utilize a system as above described merely to calculate and display a current balance or to provide by further step the actual printing of the stub information with the new balance printed out but unaccompanined by actual printing of the check. These and other modifications will be apparent as now described.

FIGS. 1–5

Figures 1, 3:
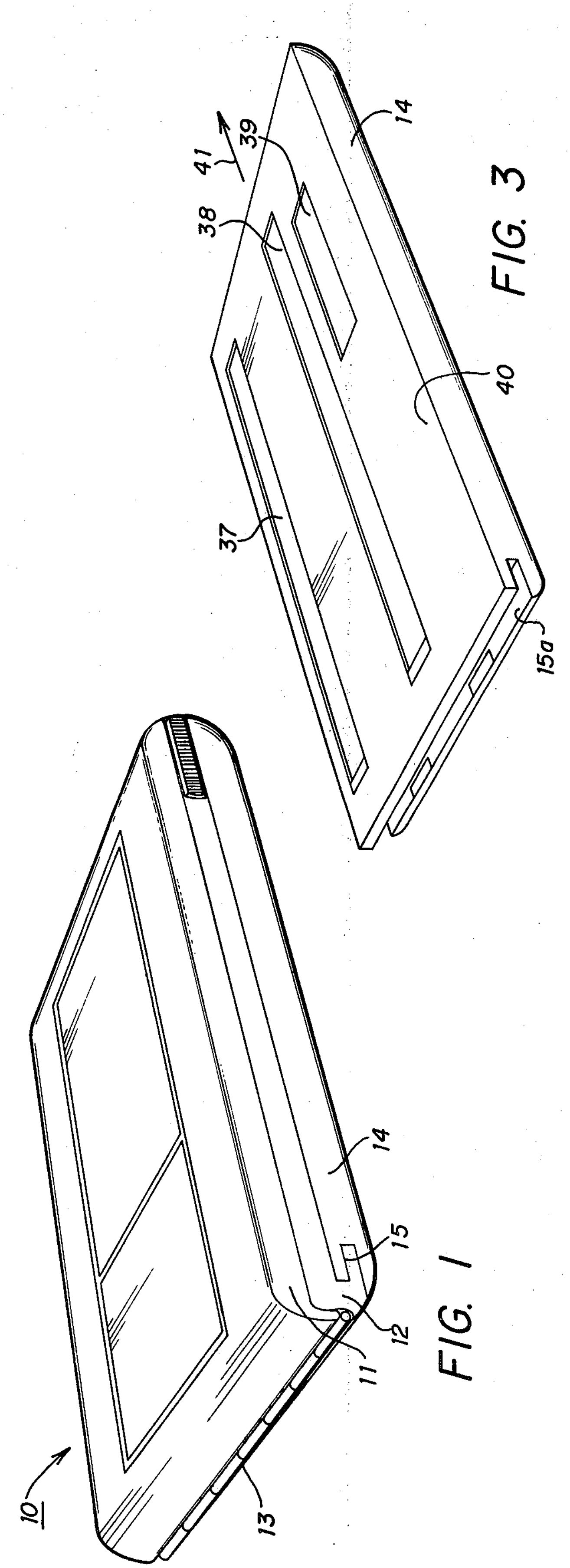
FIG. 1 is an isometric view of the top and two sides of an embodiment of the invention.
FIG. 3 illustrates a check pack unit forming part of the unit of FIGS. 1 and 2.

In FIG. 1, a hand held battery operated unit 10 comprises a cover 11 hinged to a base 12 by hinge 13. Base 12 has associated with it, in removable relation, a blank check pack 14 which is suitably coupled to the base 12 by a tongue and groove coupling 15 together with a suitable latch, not shown in FIG. 1.

Figure 2:
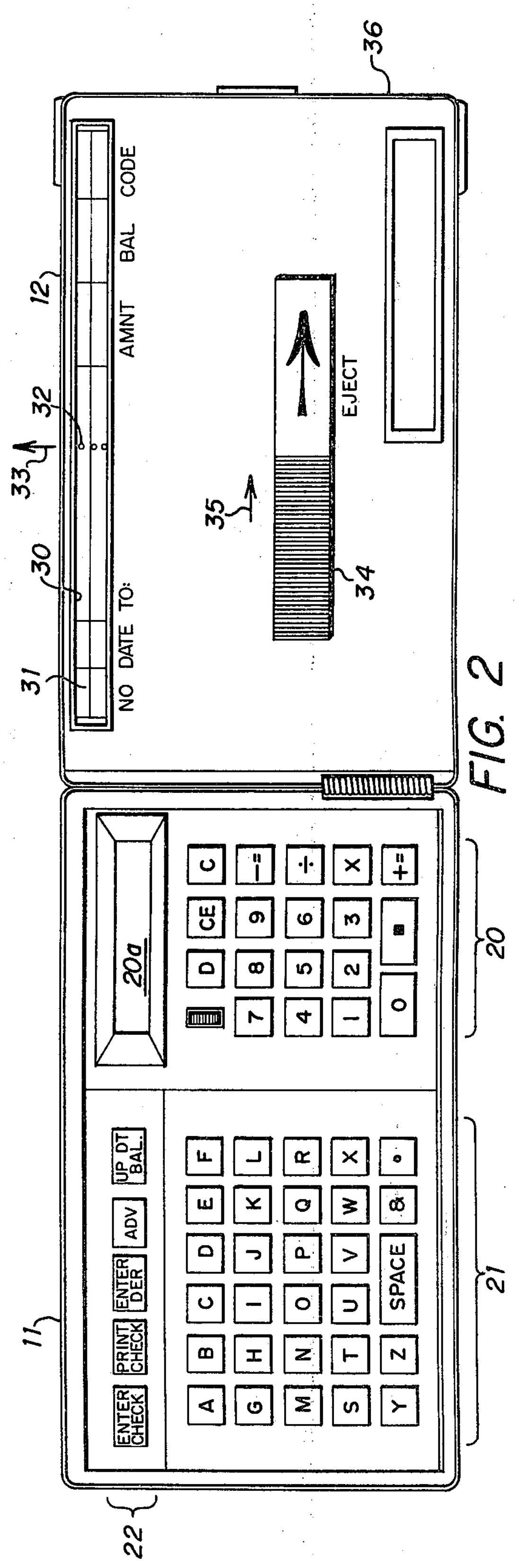
FIG. 2 illustrates the unit of FIG. 1 unfolded along a central hinge line.

In FIG. 2, the cover 11 is shown unfolded with the upper face of the base 12 exposed. Mounted on the inner surface of cover 11 are three keyboards, or fields of keys. The first keyboard 20 corresponds in general to those of the well known pocket calculators, such as manufactured and sold by Texas Instruments Incorporated, Dallas, Texas under the designation electronic calculator TI-2500. A calculator of which keyboard 20 forms a part is capable of performing the four arithmetic functions, add, subtract, multiply and divide.

A second keyboard 21 positioned beside keyboard 20 is provided for alpha inputs to the system. A third keyboard 22 comprises a single row of switches and forms a function keyboard to command selected functions in the system. A calculator display panel 20*a* is mounted above the keyboard 20 for display of the results of operation of the calculator emboyding keyboard 20.

Figure 4:
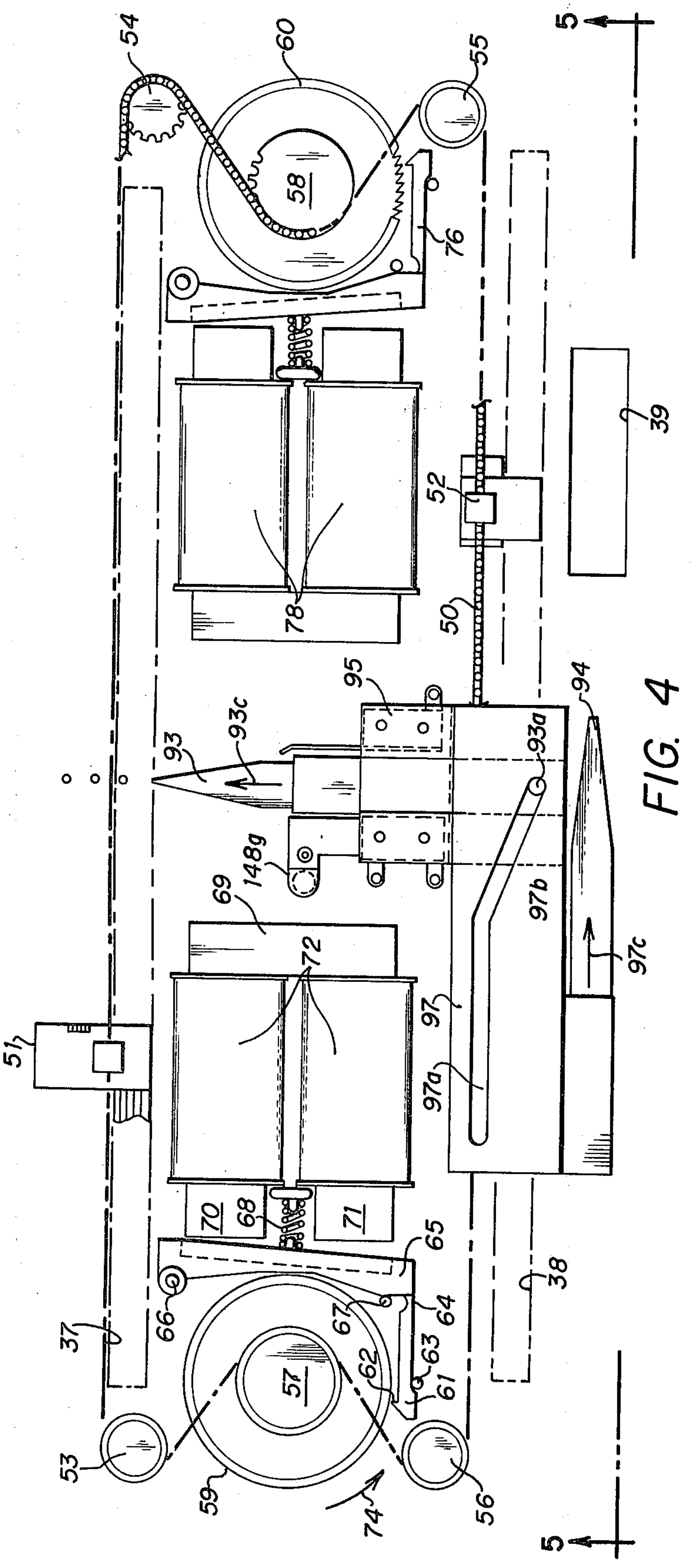
FIG. 4 is a schematic view of the printing and check handling mechanism.
Figure 5:
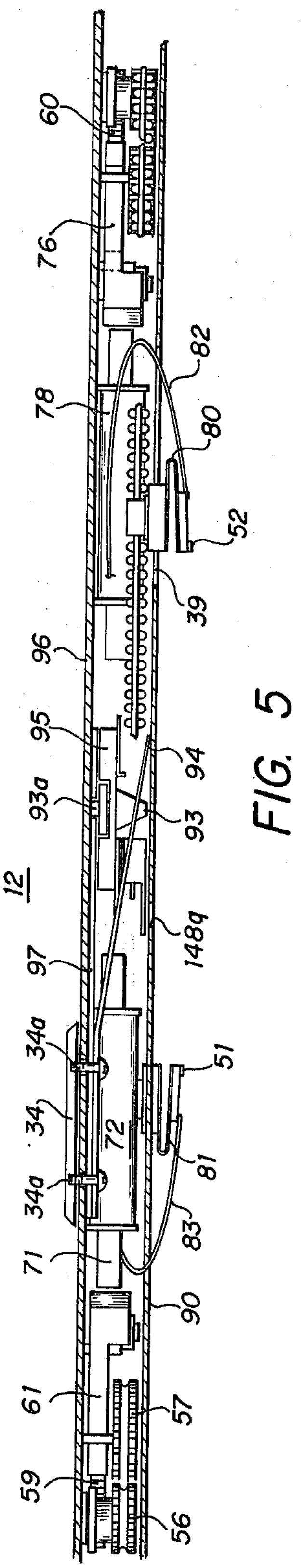
FIG. 5 is a view taken along lines 5—5 of FIG. 4.
Figure 5B:
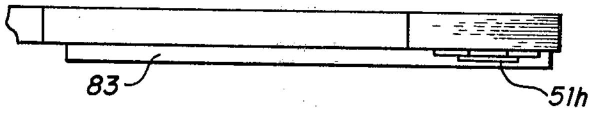
FIG. 5B is an edge view of the unit of FIG. 5A.
Figure 5A:
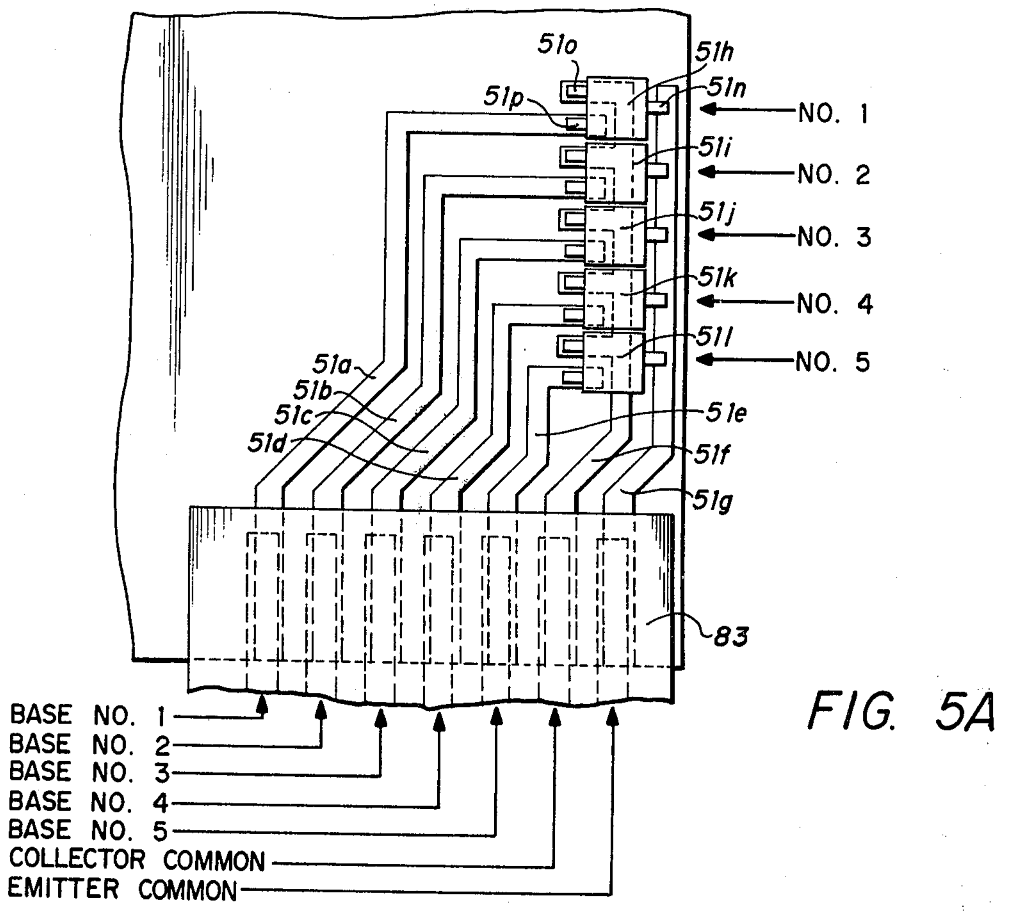
FIG. 5A is an enlarged view of a face portion of the printer 51 of FIGS. 4 and 5.
Figure 5C:
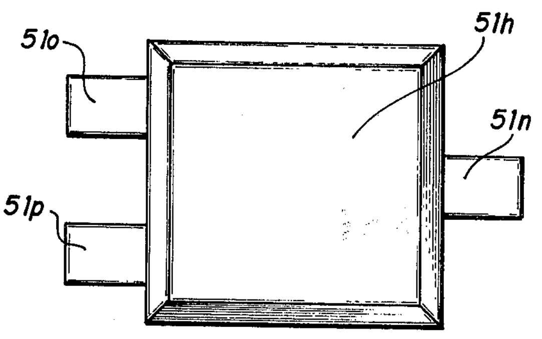
FIG. 5C is an enlarged view of the face of one of the printing elements of FIG. 5A in the form of a transistor with leads extending therefrom.
Figure 5D:
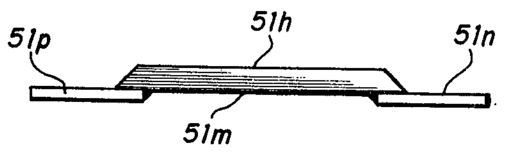
FIG. 5D is a side view of the unit of FIG. 5C.

The face plate of the base 12 is provided with a window 30 through which a lateral slice 31 of a strip of paper issuing from a check stub roll may be viewed. A row of perforations 32 is formed on a longitudinal line on strip 31. In FIGS. 4 and 5 the point of a pawl 93 engages the perforations to advance strip 31 in the direction of arrow 93*c* as the tip of a pawl 94 engages a printed check through a slot 39 to complete each check issuing operation.

Slot 39 is provided to expose the top check in park 14 for movement by pawl 94 of the top check in the direction of arrow 97*c* a distance adequate to permit the check to be grasped and withdrawn from pack 14. As the ejector pawl 94 moves into solt 39, pawl 93 moves laterally across slot 37 to advance the check stub roll one line as above described in connection with FIG. 2. The face plate of unit 12 is provided with a button 34 which slides in the direction of arrow 35 to move pawl 94 to transport the lead edge of a check through a slot (not shown) in the end 36 of check pack 14. Movement of button 34 in the direction of arrow 35 moves pawls 93 and 94.

The unit of FIGS. 1–3 typically may have dimenisons of about 6 inches by 3.5 inches by 1 inch, thus adapted to fit into a coat pocket or a woman's purse and serve as a personal electronic check writer.

Check pack 14 preferably is a replaceable unit. Pack 14, shown in FIG. 3, is disengaged from base 12. Pack 14 is provided with a slot 15*a* to receive tongue 15 formed on base 12. Three slots 37, 38 and 39 are formed in the upper plate 40 of the check pack 14. A stack of check blanks provided in pack 14 are normally urged upward so that the top check blank is positioned against the underside of panel 14 with a portion of its face exposed throuogh slot 38 to a print head which, in accordance with the invention, will be moved along the length of the slot 38 by a mechanism in base 12 automatically to print desired information along a path exposed by slot 38.

A transverse strip of stub paper in the check pack 14 is exposed through slot 37. A second printer will contact the stub strip through slot 37 to print thereon an entry representing the transaction to be carried out through the issuance of the check which is written through slot 38.

Also located in check pack 14 is a flat battery of the type manufactured by Ray O Vac for the Polaroid SX-70 camera. This battery supplies the entire unit except for the CMOS Store Memory, and is large enough to operate the calculator for several hours and to print all of the checks in the pack.

FIGS. 4 and 5 schematically illustrate the printing and paper handling mechanism of the unit of FIGS. 1–3.

In this embodiment, a stub printhead 51 and a check printhead 52 are mounted on a bead chain 50. Chain 50 tranverses a course around four idler sprockets 53–56. The chain 50 also passed around drive sprockets 57 and 58. Sprockets 57 and 58 are mounted as to be integral with, keyed to the same shaft, or otherwise turned directly by movement of toothed drive wheels 59 and 60, respectively. Drive wheel 59 is driven by a magnetically actuated pawl 61 which has a hook 62 adjacent the toothed periphery of wheel 59. The opposite surface of the pawl 61 normally is urged against a positioning pin 63 by a spring section 64 of the pawl. The pawl 61 is mounted a toggle arm 65 which is pivoted on a shaft 66. Arm 65 normally is urged against a pin 67 a spring 68. A magnetic core 69 of U-shaped is mounted with the poles 70 and 71 coplanar and confronting the rear surface of the toggle arm 65. Coils 72, mounted on core 69, when energized will cause the pawl 61 to move wheel 59 in a direction of arrow 74. Thus, during operations in which the stub printhead 51 is to be energized to print on the stub paper appearing through slot 37, FIG. 3, the coils 72 will be pulsed to step the printhead 51 along the line to be printed. AT the same time, the check printhead 52 moves from the end of the normal print line to the beginning. The operation, as will be described, is such that when the check is to be written, the Enter key in keyboard 22 will be depressed and an entry will be made to the unit through the appropriate keyboard shown in FIG. 2. The check number, date, payee and amount will be entered via keyboards 20 and 21. This will energize the system such that the stub printhead will be moved and energized to apply to a heat sensitive stub strip legends indicative of that information and also the balance in the account. With this operation completed, the maker can view the entry on the stub and verify its accuracy. If accurate, then the "PRINT CHECK" button is depressed and coils 78 would be pulsed to drive wheel 60 through pawl 76 so that the check printhead 52 would traverse the length of the desired line to be printed on the check appearing through the slot 38. Such operation then completes the printing of the check. The printed check may then be advanced by moving button 34 and then removed from the unit and signed to become a negotiable instrument.

FIG. 5 illustrates a portion of the base unit 12 in sectional view. Check printhead 52 is mounted on a spring 80 with the stub printhead 51 mounted on a spring 81. Suitable cables 82 and 83 lead from printhead control electronics to the elements of the printhead. Button 34 is secured by screws 34*a* to pawl 94. Pawl 93 is mounted in a guide plate 95 secured beneath the cover plate 96. A cam plate 97 is secured to pawl 94 and button 34. As best shown in FIG. 4, cam plate 97 has a slot which has a longitudinal portion 97a and an angled portion 97*b* in which a pin 93*a* is positioned. Pin 93*a* is secured to pawl 93. As plate 97 and pawl 94 move in the direction of arrow 97*c* by actuation of button 34, pawl 93 is driven in the direction of arrow 93*c* by action of pin 93*a* in slot 97*b*.

Because of its simplicity, thermal printing is advantageous for this application. Printheads 51 and 52 suitable for use with the invention may be constructed as shown in FIGS. 5A-5D. These printheads are of a simple type which print one column of a character at a time. Characters may be made from 5 × 5, 5 × 7 or 7 × 9 matrices. A head for printing a 5 × 5 matrix is illustrated, although a 5 × 7 matrix provides more readable characters and is probably preferred. A head for 5 × 7 characters would be identical to that of FIG. 5A, except that two more beam lead heating elements would be added.

Printhead 51 is illustrated typically fabricated on a ceramic substrate, although other suitable substrates may also be employed. A plurality of printed circuit lines 51*a*–51*g* are formed on the lower face of the substrate using methods which are well known in the semiconductor art. A plurality of heater elements 51*h*–51*l* are mounted on the substrate. Each of the heater elements 51*h*–51*l* is composed of a monolithic chip of semiconductor material typically about 0.23 × 0.025 × 0.005 inch in size. A transistor may be formed in face 51*m* of the chip adjacent the ceramic substrate using diffusion and other conventional methods which are well known in the semiconductor art. This transistor may have a relatively high collector resistance so that the respective chip will be heated by collector current when the transistor is turned on by an appropriate voltage applied to its base. Although a transistor element is preferred for this application due to the smaller control currents required, it is also possible to use resistors or lossy diodes as heating elements. In these cases only two connections to each element would be required. Beam leads 51*n*, 51*o* and 51*p* are connected to the collector, base and emitter of the transistor formed in the face 51*m* of the heating element 51*h* by conventional beam lead methods which are also well known in the semiconductor industry, and typically include electroplating relatively thin metallized films formed by deposition on the surface 51*m* of a major slice to produce thick films, followed by a reverse etching step, in which the silicon is etched from the side opposite side 51*m* until the beams 51*n*, 51*o* and 51*p* are left in the cantilevered positions illustrated.

The collector and emitter beam leads 51*n* and 51*o* of all of the elements 51*h*–*511* are connected to conductors 51*f* and 51*g* formed on the ceramic substrate. The base beam leads 51*p* of the elements 51*h*–51*l* are connected to conductors 51*a*–51*e*, respectively. The beam leads 51*n*–51*p* may be connected to the conductors 51*a*–51*g* by any suitable conventional method, such as by ultrasonic welding techniques. The conductors 51*a*–51*g* are electrically connected to the electronics by a conventional flexible strap 83 having a corresponding number of conductors formed on one face and mated with the conductors 51*a*–51*g* using conventional techniques.

The structure of printheads 51 and 52 as above described is described and claimed in copending application Ser. No. 254,668, filed May 18, 1972 with applicants herein as the applicants to said copending application.

FIGURE 6

A block diagram of the electronics involved in the system of FIGS. 1–5 is shown in FIG. 6. Keyboards 20 and 21 comprise an array of single pole, single throw push button swithes connected to provide continuity at the cross points of an *nx-y* type electrical switching matrix. Switches in keyboard 22 are not included in the matrix. They control the system functions. The switches in keyboards 20 and 21 include all alphanumerics to be printed as well as a few symbols. A commonly used *x- y* scanning techniques uses two three-bit counters to scan an 8 × 8 switch matrix in conjunction with a multiplexer and demultiplexer. Such technique enables each switch to generate a unique six-bit decode when depressed. The location of a given switch in the array determines the code generated upon closure of the switch. A six-bit ASCII (American Standard Code for Industrial Information) format is employed to match a read-only memory (ROM) used in the embodiment to be described herein. The system has the ability to print a maximum of 64 characters including the entire alphabet in capitals, all 10 numerals and some symbols such as period (.), slash (/), asterisk (*), plus (+) and minus (−).

Four multiplexers are involved in the system illustrated in FIG. 6. The first is a serial memory and keyboard multiplexer 114. The second is a calculator input multiplexer 124. The third is a calculator and storage memory multiplexer 140, and the fourth is a print multiplexer 116. Each of the multiplexers contains two QUAD two-to-one multiplexers. They are used to select the desired source of information for each of the units which they feed. The circuitry for controlling the multiplexers will be described as forming part of a timing and control unit 109.

A calculator 126 represents a typical 1-chip calculator having the four basic arithmetic functions, +=, +=, × and ÷. In addition, the calculator has a unique 6-bit ASCII input capability for the numbers 0–9, decimal point, and the +=, −= operation. All other functions may be directly key operated or actuated by the timing and control unit 109. Calculator 126 includes the usual seven-segment output data display and driver unit 128. Calculator 126 also feeds a synchronizer section of the timing and control unit 109 which indirectly generates a six-bit ASCII code.

The display and driver unit 128 provides an array of digits with a movable decimal point and + and − sign capability. The digits are the common seven-segment type and may be formed of light emitting diode arrays, liquid crystals or other suitable low power consumption display units. The drivers for the array are power buffers between the output of calculator 126 and the displays in unit 128.

Synchronizer circuitry in the timing and control unit 108 synchronizes the output data from the calculator 126 to the rest of the system when such output data is to be operated upon. This is necessary since the calculator clock and the system clock are of different frequencies and are independent of each other. The synchronizer circuit, as will be shown, consists of a four-bit storage register and a coincidence detector which is governed by elements of the timing and control unit 109.

Memory 112 includes six 64-bit serial shift registers operating in parallel and a 2-phase clock generator. Memory 112 is used to store information entered when a stub is printed and thereafter read out from such memory and then printed when a check is to be written.

A storage memory unit 142 is a parallel array of four 8-bit serial shift registers used to store present balance information continuously. In the present embodiment, CMOS shift registers with a separate battery power supply are employed. Alternatively, the memory could be built with MNOS devices, an electrically alterable amorphous memory, or even magnetic cores. It is necessary for this memory to retain the balance information when the battery of the check pack unit 14, FIG. 3, is discharged or disconnected, and it is therefore powered continuously by battery 142*b* (FIG. 12), a set of three mercury cells RM-625 located physically in base 12.

A character generator 118 contains a read only memory (ROM) and associated buffer and address circuitry to convert the six-bit ASCII data words into thirty-five states represented by a 5×7 character array. The output from character generator 118 to printheads 51 and 52 is a sequence of seven bits repeated five times to print any complete character.

The character generator 118 is connected to printheads 51 and 52 by way of a printhead control unit 146.

Printheads 51 and 52 each comprise a single column of seven semiconductor elements which when activated heat quickly to a temperature sufficient to produce a darkened spot on a thermally sensitive paper.

The timing and control unit 109 is shown not connected to the other elements of the system. This is because it is actually associated with each of the elements of the system in manner to be described. The heart of the timing and control unit 109 is a counter chain which is formed by three variable modulus counters and operates in conjunction with a formate control section 144.

The first such counter of control unit 109 is a column counter which determines the number of clock pulses required for each character generated in the unit. There are seven columns required. Five of the seven columns are used for actually printing the character and two columns are employed for character spacing.

The second counter is a character counter. It determines the number of characters to be printed in each subheading such as five characters for the date, 20 characters for the payee, etc.

The third counter is an index counter. This counter determines the number of subheadings for each different function selected.

From the above three counters, decode and sequencing control states are generated for all functions The memory store unit 142 involves a passive operation. That is, when the power switch is turned off to the system, power is continuously applied to the memory store unit 142 to retain the contents of the memory. This action occurs continuously after initial installation of a memory store battery supply and preferably has a life of the order of several months.

FIGS. 7–12

FIGS. 7–10 illustrate in detail an embodiment of the present invention which in part utilizes components of a calculator 126 manufactured and sold by Texas Instruments Incorporated as built around a one-chip calculator unit TMS1802. The embodiment also employs an MOS character generator, serial access memory, and transistor-transistor logic. The system of FIGS. 7–10 is described herein to portray the combination of means plus their function. In a final production embodiment, all of the essential functions of the system of FIGS. 7–10 would be incorporated on two or three MOS chips in accordance with current manufacturing practices.

Figure 7:
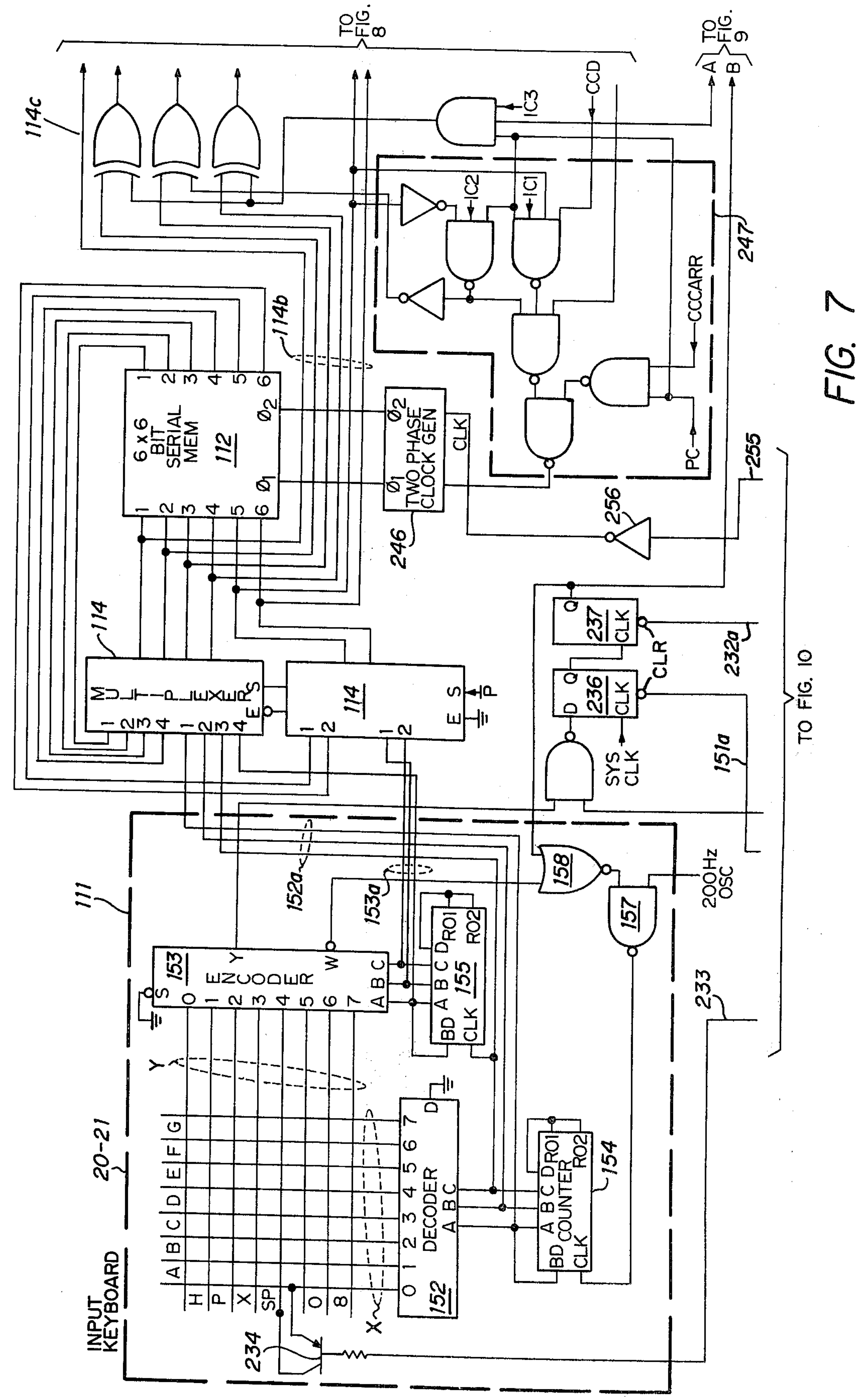

Referring now to FIG. 7, a keyboard unit 111 includes the switches of keyboards 20 and 21, FIG. 2. The keyboard switching matrix comprises an *x*- *y* set of eight lines each. The set *x* from matrix 111 leads to a decoder 152. Three output lines from decoder 152, namely, lines 152*a*, lead to inputs of a multiplexer until 114. The set *y* from matrix 111 leads to an encoder 153. Three output lines from encoder 153, the lines 153*a*, lead to a second portion of multiplexer 114. Decoder 152 is connected to a counter 154. Encoder 153 is connected to a counter 155. The unit comprising the keyboard 111, units 152 and 153, counters 154 and 155 form a well known matrix encoding system utilized on many presently commerically available keyboards. Lines 152*a* provide the first three bits of the six-bit ASCII code. Lines 153*a* provide the other three bits of the ASCII code as is conventionally produced by a keyboard encoder system thus far described.

The output of a multiplexer 114 is connected by way of lines to serial memory unit 112. Lines 114*b* connect the output of multiplexer 114 by way of a gating unit 114*c* to a print multiplexer 116. Lines 114*d* from unit 114*c* lead to a decoder 124 and thence to a decoder 110 to provide numerical input control to calculator chip 210 in calculator 126. Since the calculator chip 210 forming part of the conventional calculator unit 126 requires only numerical data pulse a decimal point, plus, minus, divide and multiply signs, only four lines 114*d* are necessary. The output of decoder 110 then provides on lines 110*a* the necessary output states to control calculator unit 126.

The print multiplexer 116 is connected by way of an interface unit 116*a* to a character generator read only memory 118. The character generator ROM 118 is connected by way of an interface unit 118*a* and thence by way of seven conductors 118*b* to the input of a printhead 51 and to the input of a second printhead 52. The latter printheads are seven element versions of the configuration of FIGS. 4 and 5.

A format control logic unit 144 is provided for the control of the printing operation. A printhead control unit 146 is provided further for controlling the operation of the printheads 51 and 52. Units 144 and 146 will be described in further detail. However, before doing so it will be helpful to provide an indication of the role played by calculator 126, FIG. 11. It will be noted that a switching matrix 110*b* is provided with four lines *y* leading to chip 210 and 11 lines *x* leading to chip 210. The lines 110*a* are connected through transistor switches to the matrix 110*b*. Only one such switch, the switch 110*c* is shown. Switch 110*c* effectively cloess to establish continuity across the first horizontal matrix *y* line and the zero (0) vertical matrix *x* line. Others of the lines 110*a* are similarly controlled so that when the numerical inputs (0–9) of keyboard 20 are actuated, the resultant information is encoded and applied to multiplexer 114 and thence by way of lines 114*b*, gates 114*c* and lines 114*d* to decoders 124 and 110. The appropriate output line in the set 110*a* is then actuated to turn on the transistor switch 110*c* to effectively provide continuity between a vertical and horizontal line in the matrix 110*b*. By this means, the calculator 126 may be controlled by inputs through the keyboard matrix 111.

Calculator 126 has a clock oscillator 156, a segment buffer 128, a digit driver unit 130 and an eigth-digit seven-segment light emitting diode display unit 132. Units 128, 130, 132, 156 and 210 in this embodiment were associated in the manner illustrated in FIG. 11 in a commerically available calculator unit which was employed in the system here described.

It will be noted that there are control lines in the set 110*a* for the numerals 0 through 9, +, –, and decimal point. It will also be noted that there are additional symbols in the matrix 110*b*, namely, C, CE, ÷, and II. The appropriate lines from the set *x* and *y* of matrix 110*b* for the above symbols C, CE, ÷ and *x* are connected to switches in keyboards 20 and 21, FIG. 2, in accordance with the symbols noted in FIG. 2. The latter symbols along with the junction II are also controlled internally and independent of the keyboard switches. However, all of the other switch points in the matrix 110*b* are controlled by the appropriate states on lines of the set 110*a*.

The output of calculator 126 is then applied by way of a decoder 138 and a multiplexer 140 to a storage memory unit 142. Lines 142*a* lead back into multiplexer 140 for circulation of the information in storage memory unit 142 so that the information from the calculator 126 can be called up to the printheads 51 and 52 on demand. A battery 142*b* is connected through resistor 142*c* to inverter 142*d* and to storage memory unit 142 so that the storage unit will be constantly powered so long as the battery 142*b* is in place. This permits retention of information in memory when the rest of the system is turned off.

The output of multiplexer 140 is connected by channels 140*a* to the second input of decoder 124 so that the data in the storage memory unit 142 may be entered through decoders 124 and 110 to the calculator 126 when necessary during a functional sequence.

Lines 140*a* also pass through a set of gates 140*b* and thence by way of lines 140*c* to the input to the print multiplexer 116 so that the information in storage memory unit 142 selectively can be applied to the printheads 51 and 52.

From the foregoing it will be seen that data may be entered through the keyboard matrix 111 to character generator ROM 118 and for actuating the calculator 126. Data to be printed by printhead 51 may thus be the alphabetic information entered by way of keyboard 111 or the numeric data entered by way of keyboard matrix 111 which may be processed by calculator 126 and/or applied directly through the character generator ROM 118 to the printheads. The display unit 132 provides for a selective display of numeric input data or calculator results.

As previously discussed, calculator 126 runs independently of the rest of the system in response to the clock unit 156. On the other hand, the rest of the system operates in response to a slow system clock unit 166 included in an input function sequencing unit 148, FIG. 10. Clock 166 provides an output at relatively low frequency, of the order of from 20 to 50 cycles per second. It is preferred that operation in the upper portion of the above range be employed. The frequency will be determined by the rate at which the printheads 51 and 52 are stepped and energized during the printing operation. As above mentioned, because the clock 156 and clock 166 are independent, the operation of the calculator 126 and the rest of the system must be properly synchronized. This synchronization is accomplished by the logic circuits of flip-flops 204 and 207, counter 202, encoder 208 and the input circuits leading thereto.

Figure 10:
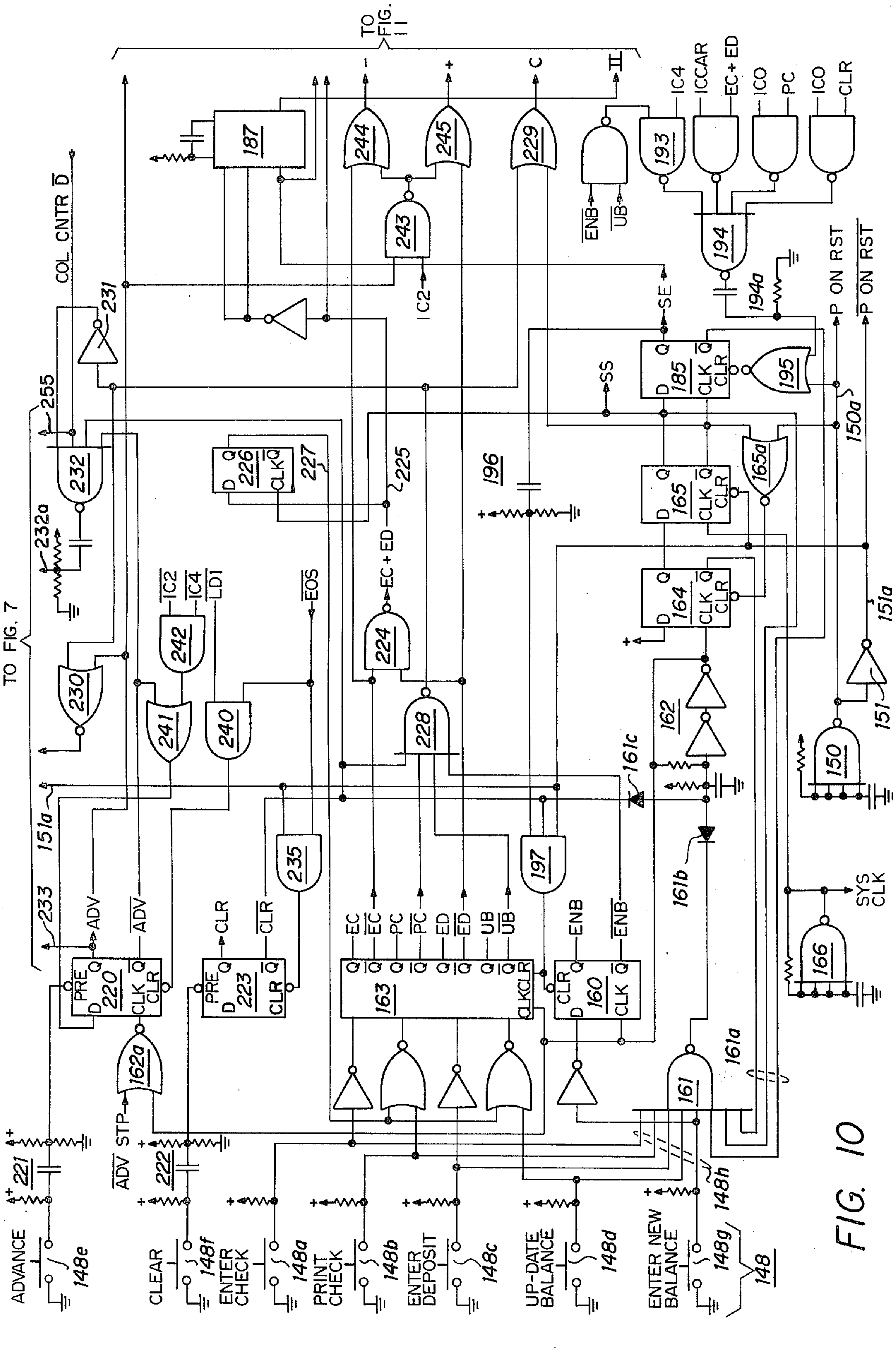
Figure 11:
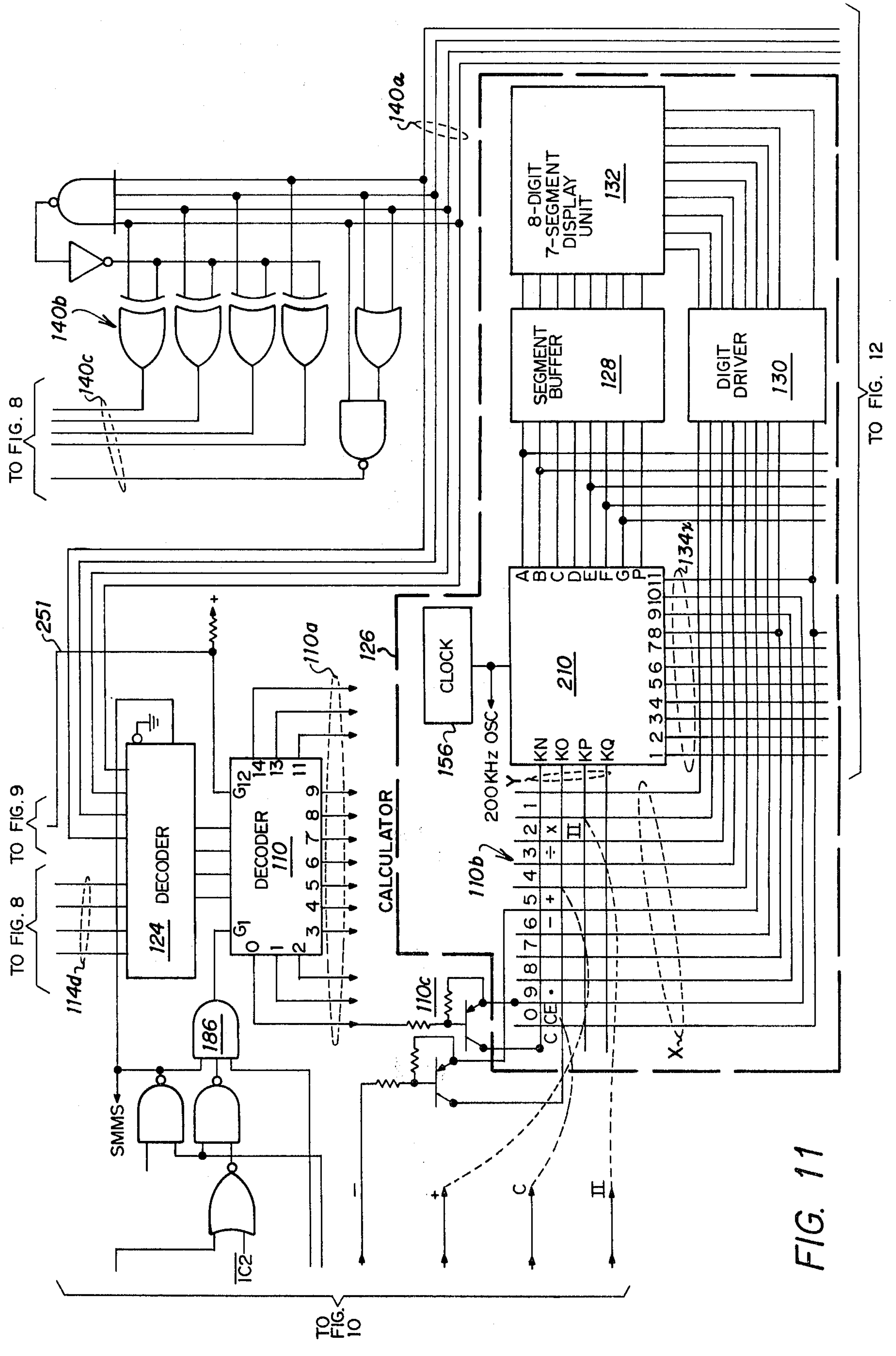

As shown in FIG. 10, the input function sequencer includes a set of switches 148*a*–148*g* some of which are included in the keyboard 22, FIG. 2. The ENTER CHECK switch 148*a*, PRINT CHECK switch 148*b*, ADVANCE switch 148*e*, ENTER DEPOSIT switch 148*c* and UPDATE BALANCE switch 148*d* form keyboard 22. A CLEAR switch 148*f* is not in keyboard 22. Rather, it is a switch which is actuated when the EJECT button 34, FIG. 2, is actuated to eject a check from the check pack 14. CLEAR switch 148*f* is actuated in the first portion of the travel of the EJECT button 34 so the unit may be cleared without ithout necessarily ejecting a check. ENTER NEW BALANCE switch 148*g* does not appear on keyboard 22. Rather, switch 148*g* is a switch which may key information to the store memory 142 by a special procedure. The switch is identified in FIG. 4 as switch 148*g* which is actuated by insertion of a suitable key or pin through an aperture in the case which permits closure of switch 148*g*.

Unit 148 includes a gate 150 which generates a power on reset state on line 150*a*. The complement appears on line 151*a*, being generated by inverter 151. The power on state is used to reset the entire support system with the exception of the memory 142 which is separately powered by battery 142*b*. The power on reset state resets all the circuitry into the neutral mode in which calculator 126 is in condition for performance of all calculation operations desired whether or not any check writing function is to be involved.

Lines 148*h* leading from switches 148*a*, 148*b*, 148*d*, 148*c* and 148*g* are connected to the input of a NAND gate 161 along with three additional lines 161*a*. The output of NAND gate 161 is connected by way of a low forward drop diode 161*b* such as a germanium diode and a delay circuit 162, FIG. 10, to the clock input of a D flip-flop 164. The Q output of flip-flop 164 is connected to the input of a D flip-flop 165. The $\overline{Q}$ output is connected by one of the conductors 161*a* into gate 161. The Q output of flip-flop 165 is also connected into the gate 161. The Q output of flip-flop 165 is connected to flip-flop 185, the Q output of which leads to gate 161. The Q output of flip-flop 165 is a sequence start (SS) state and is utilized at various points throughout the system. The Q output of flip-flop 185 is sequence enable (SE) state and is likewise utilized at various points in the system.

The line from ENTER CHECK switch 148*a* is connected by way of an inverter to a latch 163. PRINT CHECK switch 148*b* is connected by way of an NOR gate to latch 163. ENTER DEPOSIT switch 148*c* is connected by way of an inverter to latch 163. UPDATE BALANCE switch 148*d* is connected by way of a NOR gate to latch 163. The line from ENTER NEW BALANCE switch 148*g* is connected through an inverter to a D type flip-flop forming a latch 160. The output of delay unit 162 is connected to the clock inputs of latches 160 and 163 and, by way of a NOR gate 162*a*, to the clock input of a flip-flop 220. The line from ADVANCE switch 148*e* is connected by way of an RC network 221, FIG. 10, to the preset input termianl of flip-flop 220.

The line from the CLEAR switch 148*f* is connected by way of an RC network 222 to the preset input terminal of a D type flip-flop 223.

The output of flip-flop 220 provides an advance (ADV) state and a complement thereof. FLip-flop 223 provides a clear (CLR) state and a complement thereof. Latch 163 provides an enter check (EC) state and a complement thereof, a print check (PC) state and a complement ($\overline{PC}$) thereof, an enter deposit (ED) state and a complement ($\overline{ED}$) thereof, an update balance (UB) state and a complement ($\overline{UB}$) thereof. A latch 160 provides the ENTER NEW BLANCE (ENB) state and the complement ($\overline{ENB}$) thereof. The states $\overline{EC}$ and $\overline{ED}$ are applied to a NAND gate 224 to provide on line 225 a state EC + ED. The latter is applied to the D input of a flip-flop 226, the Q output of which is applied by way of line 227 to the second inputs of the NOR gates leading from switches 148*b* and 148*d*. The Q output (SS) of flip-flop 165 is connected to the clock input of flip-flop 226.

The $\overline{PC}$ state, the $\overline{UB}$, the $\overline{ENB}$ state and the $\overline{CLR}$ state are applied to a NAND gate 228, the output of which is connected to OR gate 229, to NOR 230, and through inverter 231 to NAND gate 232. The ADV state from flip-flop 220 is connected by way of line 233 to a transistor switch 234 which is connected in parallel with a push button switch in matrix 111 so that the SPACE function may be enabled by pressing the SPACE button on keyboard 21 of FIG. 2 or by the state ADV from flip-flop 220.

The $\overline{Q}$ output of flip-flop 223 $\overline{CLR}$ is connected to one input of an AND gate 197. The second input of AND gate 197 is supplied by way of line 151*a* which leads to the CLEAR terminal of flip-flop 165 and thence to AND gate 197. Line 151*a* also leads to one input of an AND gate 235 leading to the CLEAR terminal of flip-flop 223 and to the clear terminal of keyboard gating control flip-flop 236 which operates in conjunction with a second flip-flop 237. The output of NAND gate 232 is connected by way of an RC network to the clear terminal of flip-flop 237. Line 151*a* also extends to the format control unit 144. The third input to AND gate 197 is supplied from the Q output of flip-flop 185 by way of the differentiating network 196.

The CLEAR terminal of flip-flop 220 is connected to the output of an AND gate 240, the input of which is the $\overline{EOS}$ state and the other input of which is the $\overline{LD1}$ state. The D input terminal of flip-flop 220 is supplied by way of an OR gate 241, one input of which is the $\overline{ADV}$ state. The second input is suppled from AND gate 242 with $\overline{IC2}$ and $\overline{IC4}$ input states. The $\overline{IC2}$ and $\overline{IC4}$ states are outputs from decoder 191 which decodes the output of the index counter 181, later to be described. However, in the unit 148 various outputs from decoder 191 are employed as indicated by the legends in FIG. 9. The output of NAND gate 243 is connected by way of OR gates 244 and 245 to a minus (−) line and a plus (+) line. The latter lines lead to a transistor switch of type 110*c* that is in parallel with a similar transistor switch utilized f or the corresponding lines in set 110*a*, FIG. 11. The second input to OR gate 244 is the $\overline{EC}$ state. The second input to OR gate 245 is the $\overline{ED}$ state.

In FIG. 7 a two phase clock generator 246 is connected to the two clock input terminals of the serial memory unit 112. The logic circuitry 247 serves to inhibit the balance data during the stub writing operation and also serves to insert blank spaces between the dollar amount being written on a check and the cents amount being witten on the check. The dollar figure and cents figure will appear at the appropriate locations relative to preprinted legends "DOLLARS" and "CENTS" on the face of the check.

Figure 8:
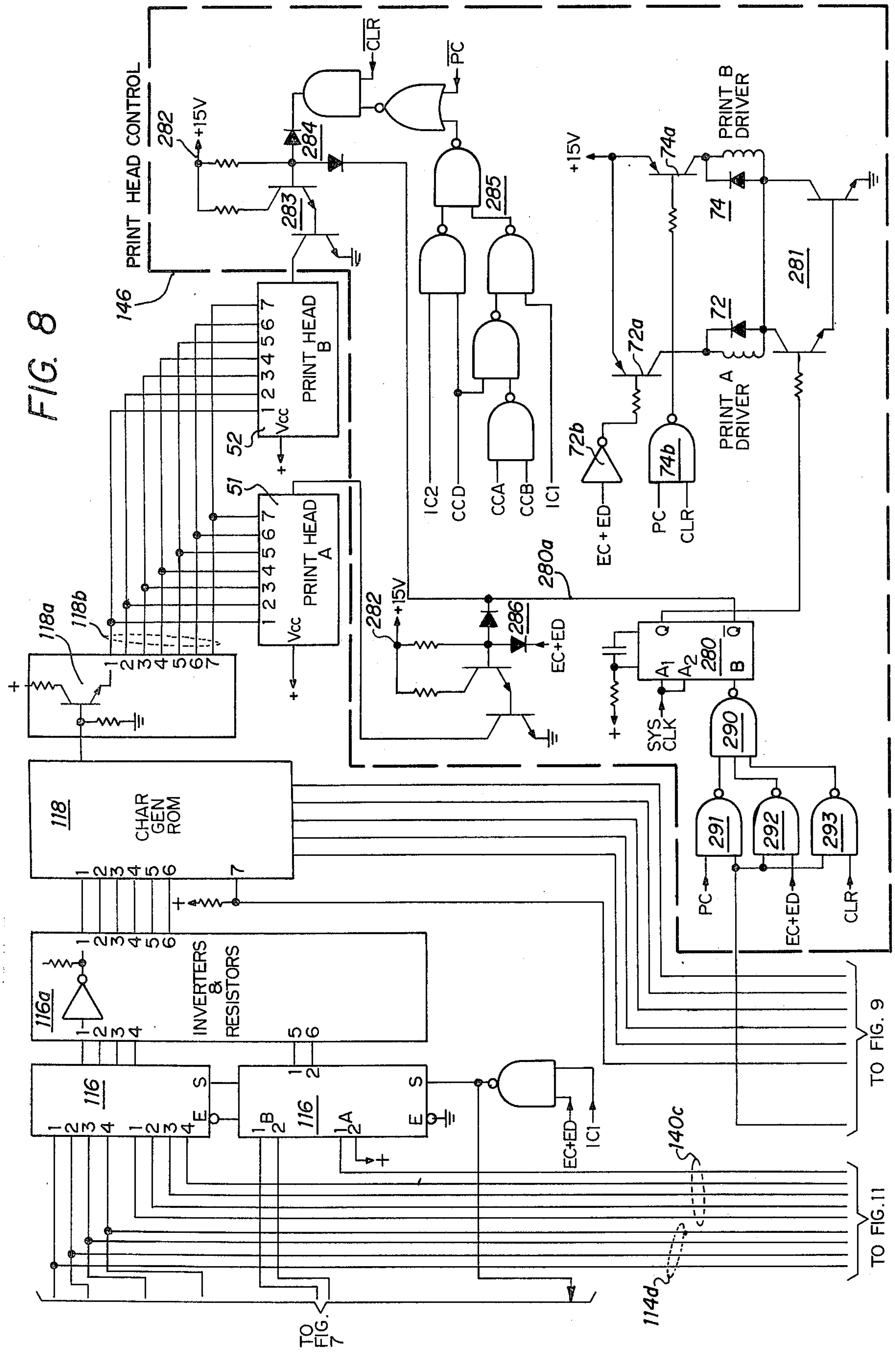
Figure 9:
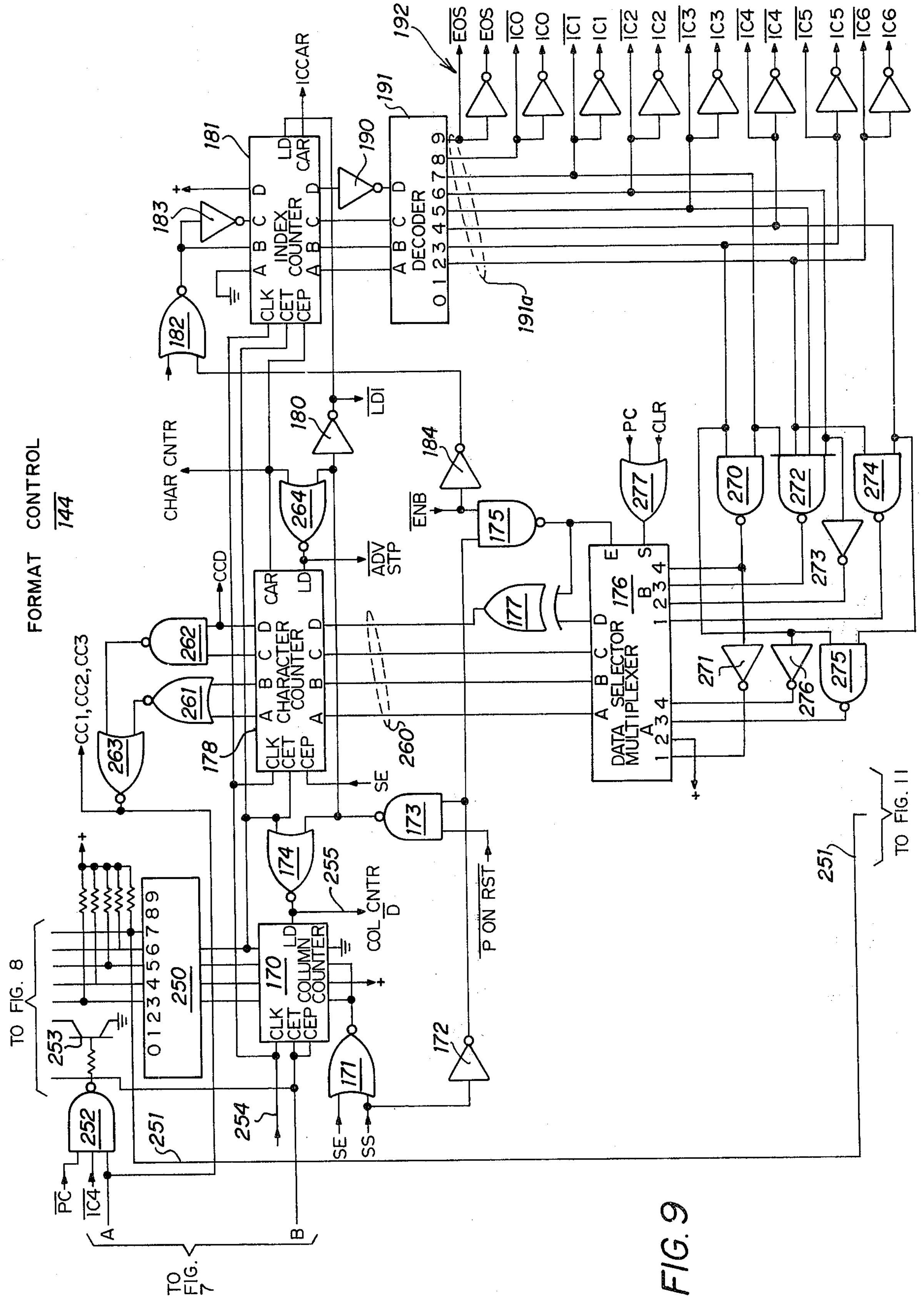

In FIG. 9, the column counter 170, character counter 178 and index counter 181 provide control signals for operation of the print units 51 and 52. As previously indicated, decoder 191 provides a set of index counter states that are utilized at various points in FIGS. 7, 8 and 10, as well as in FIG. 9. The character generating ROM 118 is controlled by code lines leading from a decoder 250. The character generator ROM 118 is enabled by means of a NAND gate 252 and a transistor switch 253. NAND gate 252 is supplied by the $\overline{PC}$ state and the $\overline{IC4}$ state. The slow system clock output is applied by way of line 254 to the clock input terminals of each of column counter 170, character counter 178 and index counter 181.

The Q output terminal of flip-flop 237 is connected to the CET and CEP terminals of counter 170. The D output terminal of counter 170 is connected through NOR gate 174 to the load terminal of counter 170 and, by way of line 255, to one input of NAND gate 232, FIG. 10. The output of NOR gate 174 is connected by way of inverter 256 to the clock input terminal of two phase clock generator 246.

In FIG. 10, the SE state and the SS state from flip-flops 185 and 165, respectively, are connected to the A and C input terminals of counter 170 by way of NOR gate 171.

In FIG. 9, the output terminal of counter 170 is also connected to the CET terminal of character counter 178. The SE state is connected to the CEP terminal of character counter 178. The A–D input terminals of counter 178 are supplied by way of lines 260 from data selector multiplexer 176. The output termianls A–D of counter 178 are connected by way of NOR gate 261 and NAND gate 262 to NOR gate 263. The output of NOR gate 263 is then connected to one input of NAND gate 252.

The carry output of counter 178 is connected along with the output of NAND gate 173 through NOR gate 264 to the load terminal of character counter 178. Carry output terminal of counter 178 is also connected to the CEP terminal of index counter 181. The D output terminal of counter 170 is connected to the CET terminal of counter 181. The $\overline{ENB}$ state is applied by way of inverter 184 and NOR gate 182 to the B input terminal of index counter 181, and to inverter 183 which connects to the C input terminal of counter 181. The A input terminal is connected to ground and the D input terminal is connected to a positive voltage source. The output of NAND gate 173 is connected by way of inverter 180 to the load input terminal of counter 181. The carry output of counter 181 provides the ICCAR state which is used elsewhere in the system.

The A-D output lines of counter 181 are connected to decoder 191 from which extends output lines 191*a* from terminals 2–9 thereof. The output lines 191*a* provide the following index counter output states: END OF SEQUENCE ($\overline{EOS}$), END OF SEQUENCE (EOS), $\overline{IC0}$, IC0, $\overline{IC1}$, IC1, $\overline{IC2}$, IC2, $\overline{IC3}$, IC3, $\overline{IC4}$, IC4, $\overline{IC5}$, IC5, $\overline{IC6}$, and IC6. $\overline{IC1}$ state and $\overline{IC5}$ state are connected through NAND gate 270 to the input B4 of multiplexer 176 and, through inverter 271 to the input $A_1$ of multiplexer 176. NAND gate 272 is supplied with $\overline{IC6}$, $\overline{IC1}$, $\overline{IC3}$ and $\overline{IC2}$ and leads to the terminal $B_3$ of multiplexer 176, and $\overline{IC2}$ by way of inverter 273 to terminal $B_2$ of multiplexer 176. NAND gate 274 is supplied with $\overline{IC4}$ and $\overline{IC6}$ states and leads to the terminal $B_1$ of multiplexer 176. NAND gate 275 is supplied with $\overline{IC4}$ and $\overline{IC5}$ states and leads to the terminal $A_3$ of multiplexer 176. $\overline{IC5}$ is connected by way of inverter 276 to the terminal $A_4$ of multiplexer 176. The enable terminal of multiplexer 176 is suppled by NAND gate 175 in response to the $\overline{ENB}$ state and the $\overline{SS}$ state. The select terminal of multiplexer 176 is controlled from OR gate 277 in response to the PC state or CLR state.

The A–D outputs of multiplexer 176 are as previously explained supplied to character counter 178 by way of lines 260.

The printheads 51 and 52 are stepped physically along the lines on which printing is to be accomplished under the control of a one-shot 280, FIG. 8. When one-shot 280 is in the Q state, transistor unit 281 is energized. This enables driver coils 72 and 74 to be energized under the control of transistor switches 72*a* or 74*a*. Switch 72*a* is turned on through inverter 72*b* in response to the EC + ED state. The switch 74*a* is turned on through NAND gate 74*b* in response to the PC and CLR states.

The $\overline{Q}$ state of one-shot 280 is connected by way of line 280*a* to the energizing circuits for the printheads 51 and 52. The printheads are supplied from a power source 282 through a drive unit 283 in printhead 52. Line 280*a* is connected to the circuit 283 by way of diode 284. The printheads are further controlled through the logic unit 285. The printhead 51 is similarly powered from source 282 under the control of the EC + ED state applied by way of diode 286. The particular elements in the seven element columnar array in each of printheads 51 and 52 are then controlled by printhead logic leading from lines 118*b*.

The control for one-shot 280, FIG. 8, is in response to the slow clock applied to terminals A1 and A2 of one-shot 280. The B input terminal of one-shot 280 is supplied by way of NAND gate 290 which serves to combine through NAND gates 291, 292 and 293 the Q output of flip-flop 237, FIG. 7, with the PC state, the EC + ED state and the CLR state, respectively.

Figure 12:
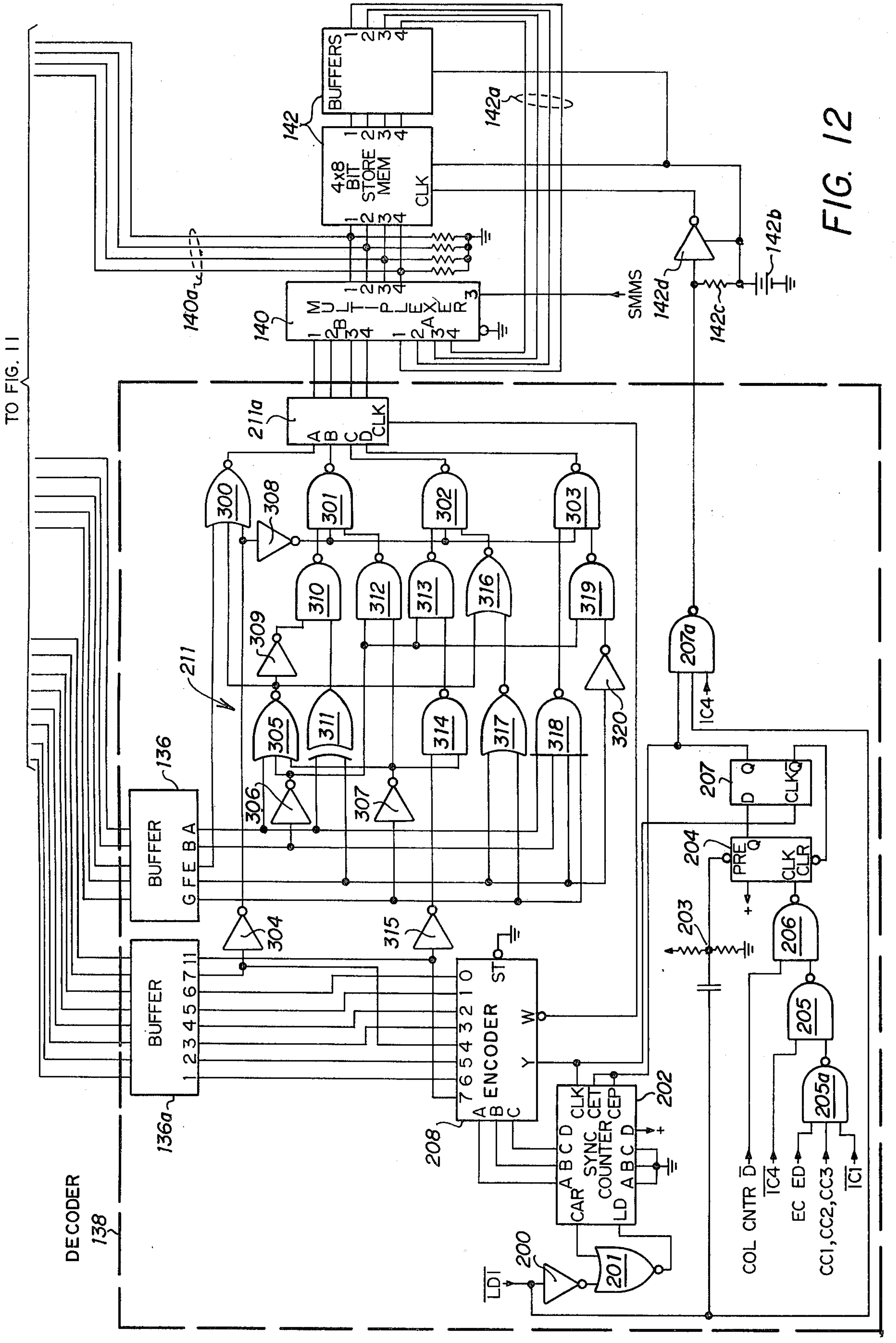

In FIG. 12 decoder 138 provides control and data for store memory 142. Included is a noninverting MOS to transistor-transistor logic buffer unit 136. The five output lines A, B, E, F and G from chip 210 are connected through the buffer 136 and thence through decode logic 211 to the transfer latch 211*a*. The A input to latch 211*a* is supplied from NOR gate 300. NAND gates 301–303 supply inputs B, C and D, respectively.

NOR gate 300 has one input supplied from the E output terminal of buffer 136. A second input is supplied by way of an inverter 304 from the seven output line of a second MOS buffer 136*a* which is connected at its inputs to lines 1–7 and 11 of the set 134*x* leading from chip 210. The third input to NOR gate 300 is supplied by NOR gate 305 which itself has three inputs. The first input of gate 305 is supplied from the A output terminal of buffer 136; the second input is supplied from the B output terminal of buffer 136 by way of inverter 306; and the third input is supplied by the G output of buffer 136 by way of inverter 307.

The output of inverter 304 is fed by way of inverter 308 to one input of each of NAND gates 301–303.

NOR gate 305 supplies one input of NAND gate 301 by way of inverter 309 and NAND gate 310. The second input of NAND gate 310 is supplied from exclusive OR gate 311. The third input of NAND gate 301 is supplied by way of NAND gate 312, one input of which is supplied from inverter 306 and the second input of which is suppled from inverter 307.

The second input of NAND gate 302 is supplied by way of NAND gate 313, one input of which is supplied from inverter 306 and the second input of which is supplied from NAND gate 314 to NAND gate 314 is supplied from the output terminal No. 11 of buffer 136*a* by way of inverter 315. The second input is supplied from inverter 307. The third input to NAND gate 302 is supplied by way of NOR gate 316, one input of which is supplied by way of NOR gate 305 and the other being supplied from NOR gate 317. One input of NOR gate 317 is supplied from the F output terminal of buffer 136. The second is supplied from the G output terminal of buffer 136.

The second input to NAND gate 303 is supplied from a NAND gate 318. One input of NAND gate 318 is supplied from the A output terminal of buffer 136 and the second input terminal is supplied from the B output. The third input terminal is supplied from the F output and the fourth terminal is supplied from the G output terminal of buffer 136. The third input to NAND gate 303 is supplied from NAND gate 319, one input of which is supplied from inverter 306 and the second being supplied from the F output terminal by way of inverter 320.

Control of transfer of calculator information from calculator 126 to store memory 142 involves the additional circuitry of decoder 138. With the index counter 181, FIG. 9, in state IC4, the control circuitry will initially be cleared from or through inverter 200, FIG. 12, by the application of load pulse $\overline{LD1}$ which is generated at the output of inverter 180, FIG. 9.

Inverter 200 is connected to one input of a NOR gate 201, the output of which is applied to a synchronizing counter 202. The $\overline{LD1}$ state also is applied by way of an RC network 203 to the preset terminal of a D type flip-flop 204. A gate 205 is enabled by the $\overline{IC4}$ state. The second input to gate 205 is from NAND gate 205*a* which is enabled by the states EC + ED, CHAR CNTR 1, 2, 3 states and the $\overline{IC1}$ state. The output of gate 205 is connected to NAND gate 206 which is enabled by the $\overline{D}$ output of column counter 170. The output of NAND gate 206 is applied to the clock input of flip-flop 204. The Q output of flip-flop 204 is connected to the D input of flip-flop 207. The $\overline{Q}$ output of flip-flop 207 is connected to the clear terminal of flip-flop 204. The Q output of flip-flop 207 is connected to the CET and CEP terminals of synchronizing counter 202. The Y output terminal of an encoder 208 is connected to the clock input terminals of counter 202 and flip-flop 207. The Q output of flip-flop 207 is connected to one input of NAND gate 207*a* along with the $\overline{LD1}$ state and the IC4 state. The output of gate 207*a* then extends to the clock input terminal of store memory 142 by way of inverter 142*d*.

Outputs 1–7 and 11 of buffer 136*a* are connected to the 0–7 inputs of encoder 208. The A, B and C output terminals of counter 202 are connected to the A, B and C input terminals of encoder 208. The W output line of encoder 208 is connected to the clock input terminal of the transfer latch 211*a*.

OPERATION

In operation, assume that the unit of FIGS. 1–12 is initially to be placed in use. The first operation is to actuate the power control switch 20*a*, FIG. 2. This applies power to all of the system except for the store memory 142 which is continuously powered by its independent battery 142*b*. The application of power actuates gate 150, FIG. 10, to generate the reset states on lines 150*a* and 151*a*. The latter states reset the entire support system with the exception of the store memory 142.

At this point, calculator 126 may be employed to perform calculator functions desired independent of any check writing operation. The following function may also be carried out.

ENTER NEW BALANCE: The amount of the balance is entered by using the keys asociated with the matrix 111 and specifically the numerical keyboard 20, FIG. 2. The system will in this embodiment accommodate four digits for the dollar amount and two digits after the decimal point. Thereafter, switch 148*g*, FIG. 10, is closed by insertion of a key through hole 148*q*, FIG. 5, to actuate switch 148*g*, FIG. 4. In the foregoing operation, depressing numeric keys in keyboard 20 affects contacts in the switch matrix 111 so that one of eight decoders 152 and eight to one encoder 153 in conjunction with counters 154 and 155 will generate a six-bit ASCII format code by generating a coincidence pulse from encoder 153 when counters 154 and 155 are at such a count that continuity is generated at a particular matrix point represented by the key being depressed. The 200 kHz system clock from source 156 is applied to counter 154 through gate 157. Encoder 153 produces an output indication at the W output. The latter output through gate 158 generates the clock inhibit that will stay the counters and decoders as long as a particular key is depressed, a latch condition having been generated.

During the latch time, the three output bits from counter 154 and three output bits from counter 155 are applied to the input multiplexer 114. The output of multiplexer 114 is then applied to decoder 110 for use in the calculator 126. The output of decoder 110 then actuates the appropriate transistor switch such as switch 110*c* to cause the calculator 126 to be operative with respect to the key being depressed in matrix 111. The closure of the transistor switch then actuates the matrix 110*b*.

After numerics representing a new balance are entered through keyboard 20 and switch 148*g*, FIG. 10, is manually closed, the following sequence takes place. Closure of switch 148*g* assures that the format circuitry and all the sequencing occurs at the proper time. Immediately when the switch 148*g* is closed, the ENTER NEW BALANCE command is latched into latch 160 to produce output $\overline{\text{ENB}}$ state. At the same time, NAND gate 161 generates a synchronizing output. Delay unit 162, a noninverting buffer with a resistor around it forms a Schmitt trigger to clock and latch latches 160 and 163. The output from delay unit 162 clocks flip-flop 164 which also actuates flip-flop 165 at the next system clock 166 0 to 1 transition. The connection through NOR gate 165*a* from the Q output of flip-flop 165 to the clear terminal of flip-flop 164 serves to clear flip-flop 164 after synchronization is complete. Flip-flops 164 and 165 function together to provide synchronization. Gate 165*a* is used to reset flip-flop 164 during the power on reset cycle.

Flip-flop 165 at the Q output provides the SS state which does three things. First, it generates a command to load column counter 170, FIG. 9, to a count of seven. Second, it generates an appropriate command to load character counter 178 to a count of eight. Third, it generates an appropriate command to load index counter 181 to a count of four. The SS state also activates flip-flop 185, FIG. 10, to generate the SE state at the Q output. The SE state is applied through NOR gate 171 to column counter 170 and remains in this state throughout the entire ENTER NEW BALANCE procedure forcing the column counter to count through the sequence from seven to zero. The SE state is also applied to the CEP terminal of counter 178, permitting the counter to advance one step at the end of each cycle of operation to the column counter 170, since the D output of counter 170 is connected to the CET input terminal of counter 178. With the three counters 170, 178 and 181 set up in their initial states and with the appearance of the SE state, the column counter 170 and the character counter 178 then count in response to the clock pulses from clock 166, FIG. 10.

During the first eight character intervals, i.e., eight outputs from character counter 178, the numeric information representing the new balance, as applied to the calculator 126, is decoded in unit 211, FIG. 12. Through transfer latch 211*a* and multiplexer 140 the new balance is stored in store memory 142. Encoder 208, together with counter 202 and flip-flops 204 and 207, serve to control the instant that any given digital code is latched into unit 211*a* for transfer into store memory 142. This is necessary in order to synchronize the continuous strobing of the calculator by the clock 156, FIG. 11, and the slow clock pulses derived from system clock 166, FIG. 10, and used in the rest of the system. The ENTER NEW BALANCE function continues until counter 178 has counted through eight characters, at which time the carry output from character counter 178, FIG. 9, is applied to the CEP terminal of index counter 181. It will be recalled that index counter 181 was preset to the count of four. When index counter 181 is stepped at the end of the cycle of character counter 178, the $\overline{\text{IC4}}$ state on NAND gate 193, FIG. 10, goes high. This change is then sensed at NAND gate 194. The leading edge is detected by an RC circuit 194*a* at the output of gate 194 and applied through NOR gate 195 to clear flip-flop 185, thereby causing the Q output to go low. The Q output is then connected through AND gate 197 to the clear terminals of latches 163 and 160, thereby terminating the ENTER NEW BALANCE operation.

ENTER CHECK: In order to write a check, the following sequence of operations takes place.

Initially, switch 148*a* is closed. Thereafter, the number of the check is entered through the numeric portion of keyboard 111. The advance switch 148*e* momentarily is closed. Thereafter, the date is entered by the numeric portion of keyboard 111 and the advance switch 148*e* momentarily is closed. The name of the payee is then entered through the alphabetic portion of keyboard 111 and the advance switch 148*e* is closed. The amount of the check is then to be entered through the numeric portion of the keyboard. Then the advance switch 148*e* is closed. The present balance automatically is then printed on the check stub. The writer's special code for the check being written is then entered through the numeric portion of the keyboard. To terminate the entry operation, the advance switch 148*e* is again and finally actuated. This completes the entry of a given check and such entry operation is accompanied by the simultaneous printing of the entry along with the present balance on the check stub by the printhead 51.

In the embodiment here described, the amount has a maximum of four dollar digits and two cents digits, i.e., $9999.99. The amount must be entered entirely because the system functions with a two place fixed decimal point for all check and deposit entries. It is not necessary to enter the decimal point or use a function key in entering the amount. The proper function is automatically selected when the ADVANCE key is depressed after the amount entry has been made. The new balance is automatically calculated and printed in the balance entry location on the stub.

The ENTER CHECK function is now complete, and will appear on the stub record in the format shown in Table I.

TABLE I

| Check No. 756 | Date 10-23-73 | Name John Doe | Amount 268.39− | | Present Balance 618.74+ | Code 4 |
|---|---|---|---|---|---|---|
| Spaces: 5 3 (8) | 8 3 (11) | 8 (8) | 12 3 (15) | 8 3 (11) | 8 3 (11) | 1 9 (10) |
| State of Index Counter 181: 6 | 5 | 4 | 3 | 2 | 1 | 0 |

The ENTER CHECK function is always followed by either a PRINT CHECK, UPDATE BALANCE or EJECT/CLEAR command.

If the information printed out on the stub is correct, the check may be printed by pressing the PRINT CHECK key. The information will then be printed on the check in the format shown in Table II.

TABLE II

| Check No. 756 | Date 10-23-73 | Name John Doe | Preprint *** 268*Dollars | | Preprint 39Cents | Code 4 |
|---|---|---|---|---|---|---|
| Spaces: 5 3 (8) | 8 3 (11) | 8 (8) | 12 3 (15) | 11 1 (12) | 7 3 (10) | |
| State of Index Counter 181: 6 | 5 | 4 | 3 | 2 | 1 | |

Check blanks may be made entirely of thermally sensitive paper, or of paper with a strip treated to be thermally sensitive. After the check has been printed, it may be removed by operation of the EJECT/CLEAR button 34. To eject, the slide is moved fully to the right and returned to the normal position. The check may then be signed to complete the transaction.

ENTER DEPOSIT: Deposits are entered in a similar manner. The ENTER DEPOSIT key is pressed and the serial number may be omitted if desired. In the payee location the word "deposit" or any abbreviation thereof is entered on the alpha keyboard. After completion of the amount entry, the addition function is automatically performed when the ADVANCE key is depressed, providing the correct balance.

The ENTER DEPOSIT function should always be followed by the UPDATE BALANCE function.

The UPDATE BALANCE function is performed by closing switch 148*d*. This function is used to make stub entries for which checks are not required. Bank service charges, automatic deductions for life insurance payments and similar entries may be made in this way. The function can be used after completion of either ENTER CHECK or ENTER DEPOSIT.

EJECT/CLEAR: This function is both a mechanical and electrical operation. After completion of the print check function, the eject button 34 is moved to its extreme right position and then returned to the left. This operation exposes the end of the check which may then be pulled out and signed. The clear function is generated by moving the eject button one-half inch to the right and then back to the left. This operation momentarily closes switch 148*f*, advances the stub, and also returns the printheads to the original positions as well as clearing the electronics. This function may be used if an error is made in entering either a check or deposit prior to either printing or updating the balance.

The foregoing description has dealt with the system shown in FIGS. 7–12. It will now be provided between store memory 142 and pc gate 228 to inhibit writing a check any time the balance is negative. This would prohibit writing checks which would overdraw the account. Further, the system may be further modified so that operation similar to a postage meter may be achieved if only a bank has a key to operate the ENTER NEW BALANCE function. The bank would enter the amount of the deposit. Deposits would be entered only by the bank, but the user could write checks until the account is exhausted. Memory could also be provided to retain the number of the next check. A clock and calendar may be included, eliminating the need to enter the date. Additional memory may be provided to store account sub-totals. This would be useful in accumulating totals of tax exempt purchases, for example. A jack permitting AC line operation of the hand held unit also is provided as is conventional in many calculators.

Thus, described above is a portable device capable of writing checks, maintaining a record corresponding to a conventional check stub, and accurately performing the arithmetic operations necessary to determine the checking account balance. It is also capable of performing all of the functions of a conventional calculator.

A hand held battery operational unit is shown in FIGS. 1–5 with an alphanumeric keyboard, a calculator keyboard and a set of function keys mounted in the cover. A replaceable pack with a stack of checks, a check stub sheet, and battery are employed. Two thermal printers driven by a single mechanism print the check stub and the check through openings in the pack, and means are provided to eject the check and to index the stub when the operation is complete.

A desk version of the ECW would contain all of the functions of the portable ECW and would be designed for AC line operation, so that the replaceable battery of the check pack would not be required. In this case bulk checks may be used.

Having described the invention in connection with certain specific embodiments thereof, it is to be understood that further modifications may now suggest themselves to those skilled in the art and it is intended to cover such modifications as fall within the scope of the appended claims.

What is claimed is:

1. A portable electromechanical check writing unit implemented electrically by integrated semiconductor circuits, comprising:

a. an alphanumeric keyset for entering alphanumeric data to said circuits for use on a check,
b. a first storage means in said circuits for storing said data,
c. a function keyset to manually command a checking operation,
d. calculator means in said circuits operable in response to storage of a numerical part of said data to compute a new balance,
e. a second storage means in said circuits for storing said new balance, and
f. a printing unit including means for automatically printing a copy of contents of said first and second storage means.

2. A portable electromechanical check writing unit implemented electrically in integrated semiconductor circuits, comprising:

a. an alphanumeric keyset for entering alphanumeric data to said circuits for use on a check,
b. a function keyset to manually command a checking operation,
c. a first storage means in said circuits for storing said data,
d. a second storage means in said circuits for storing a balance,
e. a calculator means in said circuits operable in response to storage of a numerical part of said data and to a balance in said second storage to compute a new balance, and
f. a printing unit including a first means for automatically printing a copy of contents of said first and second storage means and a second means for automatically printing selected portions of said alphanumeric data upon a check blaank in response to actuation of said function key.

3. The check writing unit as set forth in claim 2 wherein said printing unit includes:

a. a common conveyor upon which said first and second printing means are mounted, and
b. electromagnetic means to automatically step said conveyer to index said printing means.

4. The combination of claim 3 in which dual drive means are coupled to said conveyor to move said printing means in opposite directions during printing.

5. The combination of claim 3 in which said conveyor is a bead chain.

6. A portable checking unit implemented electrically in integrated semiconductor circuits comprising:

a. a continuously powered memory in said circuits for storing an account balance code,
b. an input keyset for entering input data to said circuits for use in connection with issuance of a check,
c. a function key to manually command a checking operation,
d. a first storage means in said circuits for storing said input data,
e. calculator means in said circuits operable in response to storage of a numerical part of said data and to said balance code to compute a new balance,
f. a second storage means in said circuits for storing said new balance,
g. display means for repeatedly and automatically utilizing contents of said second storage means to provide a continuous display of said new balance, and
h. means in said circuits operable upon actuation of said function key to store said new balance in said powered memory.

7. A personal check writing unit which comprises:

a. an alphanumeric keyboard for entry of transaction data including an alphabetic portion and a numeric portion,
b. circuit means to store said transaction data,
c. a calculator circuit responsive to said numeric portions to operate thereon,
d. a store memory circuit for receiving and storing the output from said calculator,
e. a pair of print means one of which is actuated in response to entry of said alphanumeric data for printing a verification thereof,
f. manual control means for actuating the second of said print means, and
g. automatic circuit means responsive to said manual control means for applying selected portions of said alphabetic and numeric portions to said second pring means for producing a separate print out thereof.

8. A personal check writing unit which comprises:

a. an alphanumeric keyboard for entry of transaction data including an alphabetic portion and a numeric portion,
b. circuit means to store said transaction data,
c. a calculator circuit responsive to said numeric portions to operate thereon,
d. a store memory for receiving and storing the output from said calculator,
e. a pair of printheads,
f. means to actuate the first of said printheads in response to entry of said alphanumeric data for printing a verification thereof along with the contents of said store memory,
g. manual control means for actuating the second of said printheads, and
h. automatic means responsive to said manual control means for applying selected portions of said alphabetic and numeric portions to said second printhead for producing a separate print out thereof.

9. A personal check writing unit which comprises:

a. continuously powered storage means to store current balance data,
b. an alphanumeric keyboard for entry of new transaction data,
c. calculator means responsive to said transaction data and said storage means to calculate a new balance data,
d. print means to present said new balance data for visual review,
e. means to print said transaction data and said new balance, and
f. means to enter said new balance in said storage means in response to printing of said transaction data.

10. A check transaction unit which comprises:

a. pocket size case having an electronic module and a print module mechanically coupled together to form a container openable to expose operable elements of each said module, said print module having at least one printhead therein movable along a longitudinal track, b. a paper holder in said print module adapted to position a blank paper sheet adjacent to said print module, c. a first memory means of construction to store balance data over long periods of time, d. keyboard input means to input check transaction data, e. second memory means to store said transaction data, f. calculator means responsive to entry of said transaction data to the information in said memory to generate new balance data and store the new balance data in said first memory means, and g. means to couple said first memory means and said second memory means to said print module to print on said sheet said transaction data and said new balance data.

11. In a check writer, the combination which comprises:

a. an electronic calculator having a numerical keyboard input means, b. a fast clock connected to said calculator to control computations in said calculator, c. a slow clock, d. a multi element columnar printhead mounted for movement transverse of the column length, e. an alphabetic keyboard to energize elements of said printhead in accordance with alphabetic information entered by means of said alphabetic keyboard, f. means to energize said calculator and elements of said printhead in accordance with numerical data entered through said numerical keyboard and automatically in response to the output of said calculator resulting from calculation performed on data entered through said numerical keyboard, and g. control means to step said printhead at the rate of said slow clock upon actuation of any key in either said keyboard.

12. A check transaction unit having an electronic portion and a printing portion mounted in a container comprising:

a. a memory means of construction to maintain the contents over extended time periods, b. a keyboard input means including number keys and operation keys to input check transaction data, c. calculator means responsive to the entry of said transaction data and to the information stored in said memory means to generate new balance data, d. means to update the contents of said memory means with said new balance data, e. means to supply the new balance data to said printing portion of said unit, and f. means to print said new balance data on a paper positioned within said printing portion of said unit.

13. A unit according to claim 12 wherein the memory means is an alterable permanent store electronic memory having a sustaining electrical supply separate from a supply powering the rest of the system.

14. A unit according to claim 12 wherein the calculator means is implemented in semiconductor integrated circuit means, and the data storage means is a semiconductor data storage unit having a continuous power supply separate from that of the calculator means.

* * * * *

PO-1050
(5/69)

UNITED STATES PATENT OFFICE
CERTIFICATE OF CORRECTION

Patent No. 3,920,979 Dated Nov. 18, 1975

Inventor(s) Jack S. Kilby et al Page 1 of 2

It is certified that error appears in the above-identified patent and that said Letters Patent are hereby corrected as shown below:

Col. 1, line 43, after "of" insert --a--;
line 44, delete "operation."
Col. 2, line 6, "systems" should be --system--;
line 60, "unaccompanined" should be --unaccompanied--.
Col. 3, line 19, "emboyding" should be --embodying--;
line 30, "park" should be --pack--;
line 34, "solt" should be --slot--;
line 43, "dimenisons" should be --dimensions--;
line 55, "throuogh" should be --through--.
Col. 4, line 5, "mechanism" should be --mechanisms--;
line 9, "tranverses" should be --traverses--;
line 10, "passed" should be --passes--;
line 19, after "mounted" insert --on--;
line 20, after "67" insert --by--;
line 21, "U-shaped" should be --U-shape--.
Col. 5, line 66, "nx-y" should be --x-y--.
Col. 6, line 3, "techniques" should be --technique--;
line 29, "+=, +=" should be --+=, -=--;
line 48, "108" should be --109--.
Col. 7, line 26, "formate" should be --format--.
Col. 8, line 23, "pulse" should be --plus--;
line 47, "cloess" should be --closes--;
line 61, "eigth-digit" should be --eight-digit--.
Col. 9, line 2, "÷, and" should be --÷, x, and--.
Col. 10, line 6, cancel "ithout";
line 35, "Q" should be --$\overline{Q}$--;
line 54, "termianl" should be --terminal--;
line 67, "BLANCE" should be --BALANCE--.
Col. 12, line 19, before "output" insert --D--;
lines 24 and 25, "termianls" should be --terminals--;
line 49, "($\overline{EOS}$)" second occurrence should be --(EOS)--.
Col. 13, line 59, "suppled" should be --supplied--;
line 63, "314 to NAND gate" should be --314. One input to NAND gate--.

PO-1050
(5/69)

UNITED STATES PATENT OFFICE
CERTIFICATE OF CORRECTION

Patent No. 3,920,979 Dated Nov. 18, 1975

Inventor(s) Jack S. Kilby et al

It is certified that error appears in the above-identified patent and that said Letters Patent are hereby corrected as shown below:

Col. 18, line 17, before "provided" insert --appreciated that additional features may be added. Logic may be--.
Col. 19, line 45, "blaank" should be --blank--.
Col. 20, line 30, "pring" should be --print--.

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*